US012794030B2

(12) United States Patent
Cummings et al.

(10) Patent No.: US 12,794,030 B2
(45) Date of Patent: Nov. 10, 2026

(54) SYSTEM AND METHOD FOR DETECTING ELECTROLYTE AND COOLANT LEAKAGE FROM LITHIUM-ION BATTERY SYSTEMS

(71) Applicant: Honeywell International Inc., Charlotte, NC (US)

(72) Inventors: Stephen R. Cummings, Worthington, OH (US); Jane L. Oberhauser, Columbus, OH (US); Bradley C. Glenn, Columbus, OH (US)

(73) Assignee: Honeywell International Inc., Charlotte, NC (US)

( * ) Notice: Subject to any disclaimer, the term of this patent is extended or adjusted under 35 U.S.C. 154(b) by 622 days.

(21) Appl. No.: 18/365,741

(22) Filed: Aug. 4, 2023

(65) Prior Publication Data

US 2024/0047773 A1 Feb. 8, 2024

Related U.S. Application Data

(60) Provisional application No. 63/370,555, filed on Aug. 5, 2022.

(51) Int. Cl.
*H01M 10/48* (2006.01)
*H01M 10/0525* (2010.01)

(52) U.S. Cl.
CPC ..... *H01M 10/486* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 6,377,559 | B1 | 4/2002 | Haardt |
| 7,087,151 | B2 | 8/2006 | Mizutani et al. |
| 7,314,761 | B2 | 1/2008 | Winter |
| 7,993,932 | B2 | 8/2011 | Winter |
| 8,048,555 | B2 | 11/2011 | Darcy et al. |
| 8,222,043 | B2 | 7/2012 | Winter |
| 8,263,244 | B2 | 9/2012 | Anantharaman |
| 8,354,184 | B2 | 1/2013 | Darcy et al. |
| 8,518,708 | B2 | 8/2013 | Winter |

(Continued)

FOREIGN PATENT DOCUMENTS

WO 2014/100937 A1 7/2014

OTHER PUBLICATIONS

Dable, B. K., et al., "Calibration of microhotplate conductometric gas sensors by non-linear multivariate regression methods", Sensors and Actuators B: Chemical, vol. 101, Issue 3, Jul. 15, 2004, pp. 284-294.

(Continued)

*Primary Examiner* — Walter L Lindsay, Jr.
*Assistant Examiner* — Geoffrey T Evans
(74) *Attorney, Agent, or Firm* — Tucker Ellis LLP

(57) ABSTRACT

A computer implemented method includes monitoring a gas analyte level associated with a battery system using a first gas sensor and monitoring at least one variable of the battery system. The method includes determining whether there exists a correlation between the monitored gas analyte level and the monitored at least one variable of the battery system. The method includes determining whether there is an electrolyte leak from the battery system based on the determination of the correlation.

20 Claims, 14 Drawing Sheets

(56) References Cited

U.S. PATENT DOCUMENTS

| | | | |
|---|---|---|---|
| 9,263,753 B2 | 2/2016 | Darcy et al. | |
| 9,306,248 B2 | 4/2016 | Yang et al. | |
| 9,991,565 B2 | 6/2018 | Sahner et al. | |
| 11,329,303 B2 * | 5/2022 | Onuma ............. | H01M 8/04228 |
| 11,340,308 B1 | 5/2022 | Schreiber et al. | |
| 11,346,554 B2 | 5/2022 | Shuk et al. | |
| 11,346,827 B2 | 5/2022 | Koller et al. | |
| 2003/0008204 A1 | 1/2003 | Winter et al. | |
| 2012/0208054 A1 | 8/2012 | Shirasawa et al. | |
| 2014/0038006 A1 | 2/2014 | Sturm et al. | |
| 2020/0088804 A1 | 3/2020 | Drees | |
| 2020/0266405 A1 | 8/2020 | Pokora | |
| 2022/0099610 A1 | 3/2022 | Glenn et al. | |

OTHER PUBLICATIONS

Cavicchi, R. E., et al., “Optimized temperature-pulse sequences for the enhancement of chemically specific response patterns from micro-hotplate gas sensors”, Sensors and Actuators B: Chemical, vol. 33, Issues 1-3, Jul. 1996, pp. 142-146.

International Search Report and Written Opinion issued PCT Application No. PCT/US23/71720, mailing date Dec. 18, 2023.

* cited by examiner

SYSTEM AND METHOD FOR DETECTING ELECTROLYTE AND COOLANT LEAKAGE FROM LITHIUM-ION BATTERY SYSTEMS

CROSS-REFERENCE TO RELATED APPLICATIONS

This application claims the benefit of U.S. Provisional Application No. 63/370,555 filed on Aug. 5, 2022, entitled "SYSTEM AND METHOD FOR DETECTING ELECTROLYTE AND COOLANT LEAKAGE FROM LITHIUM-ION BATTERY SYSTEMS" and the contents of this is herein incorporated by reference.

FIELD OF INVENTION

This technology includes systems and methods for detecting electrolyte and coolant leakage from a battery system.

BACKGROUND

A cell leak occurs when the hermetic seal of the cell within a battery system, e.g., a battery energy storage system (BESS) or an electric vehicle (EV) battery pack has been compromised resulting in an opening of the internal contents of the cell to the atmosphere. This is sometimes referred to as "cold-venting." The result of the opening of the cell is that the high vapor pressure carbonate-solvents in the electrolyte of the battery will slowly leak over time resulting in a dried-out cell which can impact the performance of the cell. It is also possible that the leaked contents of the cell could cause a flammable condition if solvents leaked from the cells are contained in a confined space, such as in an electric vehicle battery pack. The flash points of these solvents are very low (e.g., 18-25 degrees Celsius, ° C.) which create the potential for a flammable environment. Furthermore, the presence of a leak in the cell can also be a point for ingress of oxygen and moisture into the cell which can lead to failures such as thermal runaway. There is a need of systems and methods to detect electrolyte leakage.

SUMMARY

In one embodiment, a computer implemented method includes monitoring a gas analyte level associated with a battery system using a first gas sensor and monitoring at least one variable of the battery system. The method includes determining whether there exists a correlation between the monitored gas analyte level and the monitored at least one variable of the battery system. The method includes determining whether there is an electrolyte leak from the battery system based on the determination of the correlation.

In one embodiment, a monitoring system includes at least one gas sensor configured to monitor for a gas analyte associated with a battery system and at least one sensor configured to monitor one or more variables of the battery system. The monitoring system includes a controller including a memory to store machine readable instructions and a processor to access the memory and execute the machine-readable instructions. The machine-readable instructions cause the processor to monitor the gas analyte using the at least one gas sensor; monitor the one or more variables of the battery system using the at least one sensor; determine a correlation between monitored gas analyte level and the one or more variables; and determine whether there is an electrolyte leak from the battery system based on the correlation.

In one embodiment, a computer implemented method includes modulating a sensor-operational-variable profile to each of gas sensors configured to monitor a gas analyte associated with a battery system. The method includes monitoring the gas analyte using the gas sensors throughout the modulated sensor-operational-variable profiles. The method includes developing a data matrix including sensor signals generated by the gas sensors as a function of the modulated sensor-operational-variable profiles. The method includes differentiating gas species of the gas analyte based on a comparison of various features in the data matrix. The method also includes determining a condition of the battery system based on the differentiation of gas species.

In another embodiment, a monitoring system includes at least one gas sensor configured to monitor for a gas analyte associated with a battery system and a controller. The controller includes a memory to store machine readable instructions and a processor to access the memory and execute the machine-readable instructions. The machine-readable instructions cause the processor to modulate a sensor-operational-variable profile to each of the at least one gas sensor; monitor gas analyte level using the at least one gas sensor throughout the modulated sensor-operational-variable profile; develop a data matrix including sensor signals generated by the at least one gas sensor as a function of the modulated sensor-operational-variable profile; differentiate gas species of the gas analyte based on a comparison of various features in the data matrix; and determine a condition of the battery system based on the differentiation of gas species.

BRIEF DESCRIPTION OF THE DRAWINGS

In the accompanying figures, chemical formulas, chemical structures, and experimental data are given that, together with the detailed description provided below, describe example embodiments.

DETAILED DESCRIPTION

Figure 1A:
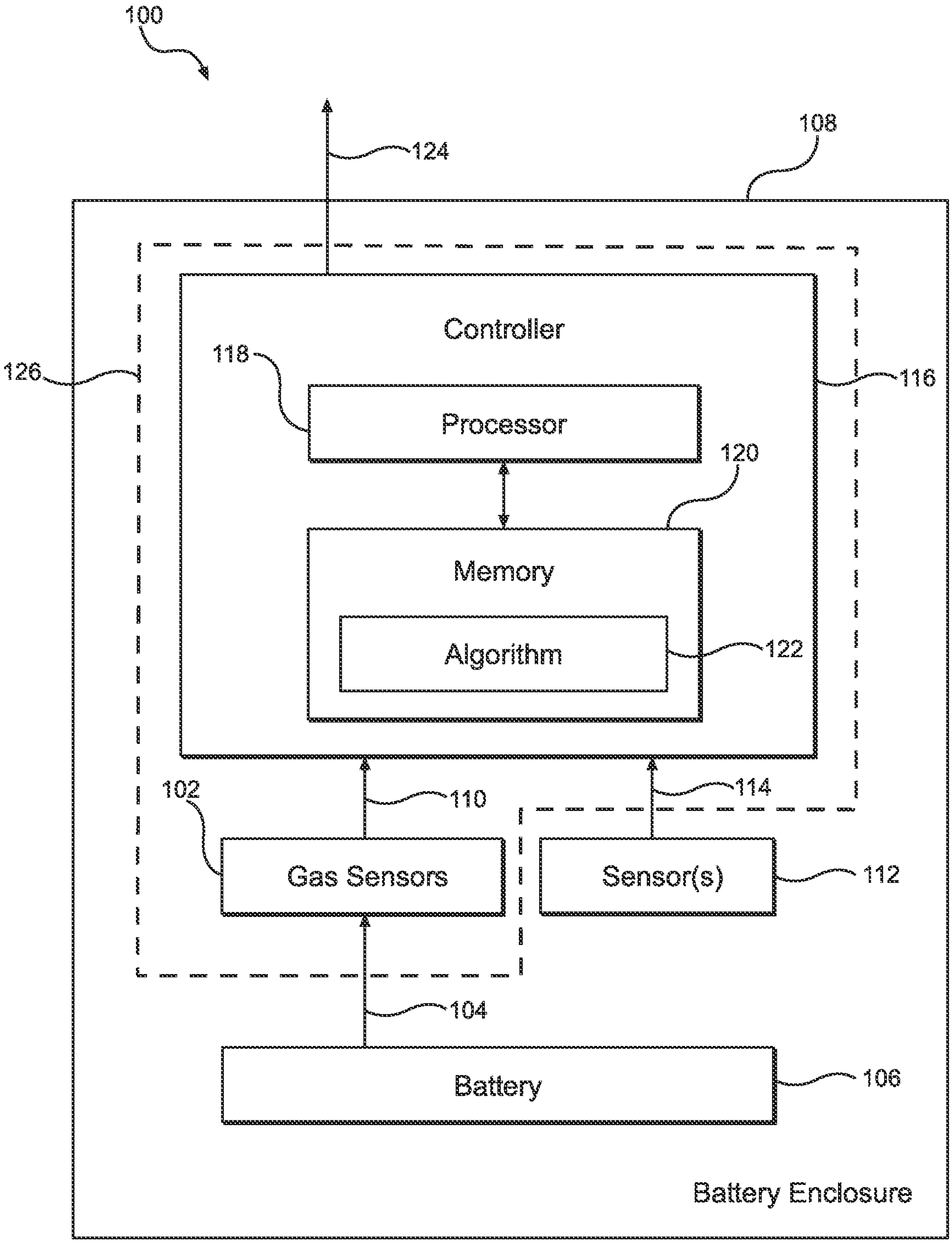
FIG. 1A is a block diagram of an exemplary monitoring system.

The present disclosure generally relates to systems and methods for detecting electrolyte and/or coolant leaks in batteries. Batteries over time may degrade progressively, which may result in a reduced capacity, cycle life, and safety issues. A degrading battery may release gases. The gases may come from electrolyte leakage, coolant leakage, or a battery off-gas/venting event. Electrolyte leakage can pose issues in loss of capacity, quality issues, potential compliance concerns, and potential safety issues. Regular inspection of batteries for any signs of deterioration shall be noted and be subject to repair, specifically in the case of electrolyte leakage and insulation failures (e.g., IEC 62485-5).

In an electrolyte leaking event, the gases released are electrolyte solvent vapors, which are the primary gases in a battery off-gas/venting event. In a battery off-gas/cell venting event, trace amounts of hydrogen ($H_2$), carbon monoxide (CO), and carbon dioxides ($CO_2$) can be released allowing it to be detected by $H_2$ and/or CO detectors in close proximity to the venting cell. However, in an electrolyte leaking event, there would theoretically only be solvent vapor, which is not detectable using $H_2$ and/or CO sensors. In particular, electrolyte leakage can happen very slowly whereas off-gas/cell venting happens quickly. Unlike off-gas/cell venting, electrolyte leakage detection is difficult because it may not occur at a distinct point in time and there may not be an ability to establish a baseline or reference (e.g., if the cell is leaking prior to monitoring then it is likely that no change will be detected).

The systems and methods described herein can detect the leakage of electrolyte and/or coolant. Furthermore, the systems and methods described herein can be configured to monitor electrolyte and/or coolant leakage in any type of battery, such as a lithium-ion battery and a lead-acid battery.

The term "gas analyte" is used herein to refers to a gas released by a battery. The gas analyte may include an off gas (i.e., "released gas" and "gas analyte") including an electrolyte gas, such as a volatile electrolyte solvent, a volatile component of an electrolyte mixture of the battery, or the like and coolant (e.g., ethylene glycol/water mixtures). Volatile electrolyte or off-gas analyte species may include one or more of the following flammable or toxic gases: lithium-ion battery off gas, dimethyl carbonate, diethyl carbonate, methyl ethyl carbonate, ethylene carbonate, propylene carbonate, vinylene carbonate, carbon dioxide, carbon monoxide, hydrocarbon, methane, ethane, ethylene, propylene, propane, benzene, toluene, hydrogen, oxygen, nitrogen oxides, volatile organic compounds, toxic gases, hydrogen chloride, hydrogen fluoride, hydrogen sulfide, sulfur oxides, ammonia, and chlorine or the like. The gas sensor(s) used herein are capable of detecting the gas analyte (if the gas analyte is present in the atmosphere).

Moreover, the systems and methods described herein can be configured with a plurality of battery enclosures. Thus, the systems and methods described herein can be used to monitor for a gas analyte released by one or more batteries located within a battery enclosure. The term "battery enclosure" as used herein refers to any housing that can at least partially encapsulate the one or more batteries. In an example, the battery enclosure can include a ventilated and non-ventilated battery enclosure. The ventilated battery enclosure can include a ventilation system that can include an intake and an exhaust. In another example, the battery enclosure can include a battery cabinet. In another example, the battery enclosure can include a battery housing for a battery system of a vehicle. In a further example, the battery enclosure can include a battery shipping container.

Moreover, the term "processor" as used herein can refer to any device capable of executing machine readable instructions, such as a computer, controller, an integrated circuit (IC), a microchip, or any other device capable of implementing logic. The term "memory" as used herein can refer to a non-transitory computer storage medium, such as volatile memory (e.g., random access memory), non-volatile memory (e.g., a hard disk drive, a solid-state drive, flash memory or the like) or a combination thereof.

FIG. 1A illustrates an example of a system 100 for monitoring electrolyte and/or coolant leakage. The system 100 includes at least one gas sensor 102 configured to monitor a gas analyte 104 released from a battery 106. The at least one gas sensor 102 may include any type of gas sensor, such as a chemi-resistive sensor, an electrochemical sensor, a semi-conductive metal-oxide sensor, a catalytic sensor, a thermal conductivity sensor, a metal-oxide semiconductor, a potentiometric sensor, an optical sensor, an infrared (IR) sensor, an amperometric sensor, micro hotplate sensor(s), or the like. The at least one gas sensor 102 may be disposed in proximity of the battery 106. The at least one gas sensor 102 is configured to generate (real time) sensor signal 110 to communicate the monitored gas analyte 104 of the battery 106.

The battery 106 may be any type of battery or battery system including an electrolyte. The battery 106 may further include a cooling system having a coolant to cool the battery 106. The battery 106 may be a lithium-ion battery, a lead-acid battery, or any other type of rechargeable or non-rechargeable battery. The battery 106 is fully or partially enclosed by an enclosure 108.

Unlike most other systems, the deployed gas sensor 102 eliminates a requirement of using a separate reference sensor in the system 100 to calculate a moving average from (real time) sensor signal 110 for detecting the gas analyte 104 released by the battery 106.

The system 100 also includes at least one sensor 112 to monitor at least one variable of the battery 106. The at least one variable of the battery 106 includes one or more of temperature of the battery 106 (e.g., cell temperature or overall temperature of the battery system), electrical current (e.g., charging/discharging current) of the battery 106, relative humidity in the ambient environment where the battery 106 is positioned, airflow (e.g., flow rate) of the ambient air surrounding the battery 106, or a combination thereof. The at least one sensor 112 include a temperature sensor, a humidity sensor, an airflow sensor, and a current or resistivity sensor. The at least one sensor 112 may be disposed on or in proximity to the battery 106, inside and/or outside the enclosure 108. In some embodiment, the at least one gas sensor 102 and/or the at least one sensor 112 may be or include sensors of a battery management system (BMS) of the battery 106. The at least one sensor 112 is configured to generate (real time) sensor signal 114 to communicate the monitored at least one variable of the battery 106.

The system 100 includes a controller 116 configured to operate and coordinate the operation of the various components in the system 100. The controller 116 may include any suitable processer 118 (e.g., microprocessor, MOSFET, IGBT, etc.) and memory 120. The controller 116 may be programed to perform certain procedures or predetermined procedures. In one example, analysis procedures or algorithm 122 are stored in the memory 120 to process/analyze sensor signals 110 and 114 to determine in real time, any released gas analyte 104 as being an event comprising one or more of: electrolyte leakage event, coolant leaking event, a water ingress event, a poisoned metal oxide sensor event, an off gas event (OGE), a thermal run away event (TRE), and an interfering gas release event (i.e., non-OGE). The sensor poisoning event discussed herein refers to a sensor being poisoned by chemicals which inhibit the sensor from carrying out its function properly, and the sensor poisoning event is not limited to a poisoned metal oxide sensor.

In another example, the analysis procedures or algorithm 122 may include machine learning (ML) or a deep learning (DL) algorithm (program code) to be executed by a processor 118 to enable the at least one gas sensor 102 to detect and classify in real time, any released gas analyte 104 as being an event comprising one or more of: electrolyte leakage, coolant leakage, water ingress, a poisoned metal oxide sensor, an off gas event (OGE), a thermal run away event (TRE), and an interfering gas release event (i.e., non-OGE).

The controller 116 may include any suitable wired or wireless communication devices/mechanism to output signal or alarm 124 based on the analysis. The output signal or alarm 124 may be an alert alarm or a logic signal sent for warning or for display on a screen to take preventive measure indicating the condition of the battery 106 (e.g., electrolyte leakage, coolant leakage, water ingress, a poisoned metal oxide sensor, OGE, TRE, non-OGE, etc.).

The at least one gas sensor 102 may be pre-trained and store the ML or DL algorithm 122 as a candidate model in the memory 120 to distinguish the sensor signals 110 detected by the at least one gas sensor 102, without any need of a reference gas sensor or any further need of re-training the at least one gas sensor 102 once deployed in the field.

The machine learning and training of the algorithm 122 steps may be performed a priori in the factory during the manufacturing process, or off-line at any time, prior to physical commissioning or installing of the at least one gas sensor 102 in the system 100. No real-time adaption would be necessary once the at least one gas sensor 102 is commissioned in the system 100. Yet alternately in another option, the ML or DL algorithm 122 may be re-trained or updated by the at least one gas sensor 102 learning new encounters to other gas analyte which had not been pre-retrained or listed in a database. The goal of this pre-training using the ML or DL algorithm is not only to detect an OGE and a coolant, but also be able to identify other gas sources detected by the at least one gas sensor 102, thus eliminating the need for a reference sensor.

In the illustrated system 100 in FIG. 1A, the algorithm 122 can be implemented in the at least one gas sensor's embedded microcontroller. The at least one gas sensor 102 and the controller 116 may be an integrated chip 126, such as an ASIC semiconductor chip. Alternatively, the at least one gas sensor 102 and the controller 116 may each be discrete components electrically connected through a wiring harness or mounted on a printed board (PCB).

Figure 1B:
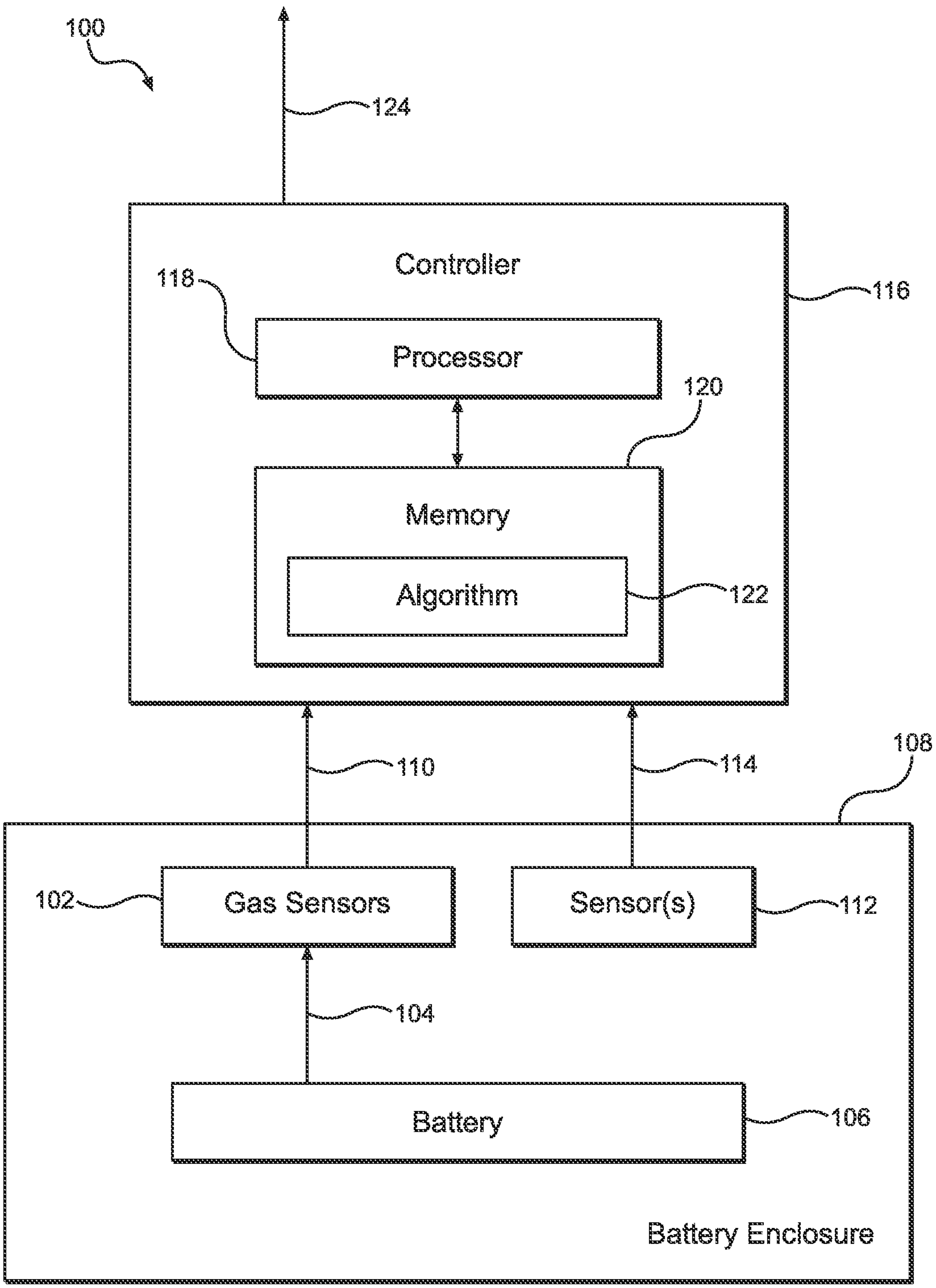
FIG. 1B is a block diagram of another exemplary monitoring system.

In another embodiment as shown in FIG. 1B, the controller 116 may be a separate computer (e.g., the computer of the BMS of the battery 106) and the sensor signals 110 can be sent to the controller 116 via wired or wireless communication.

Figure 2:
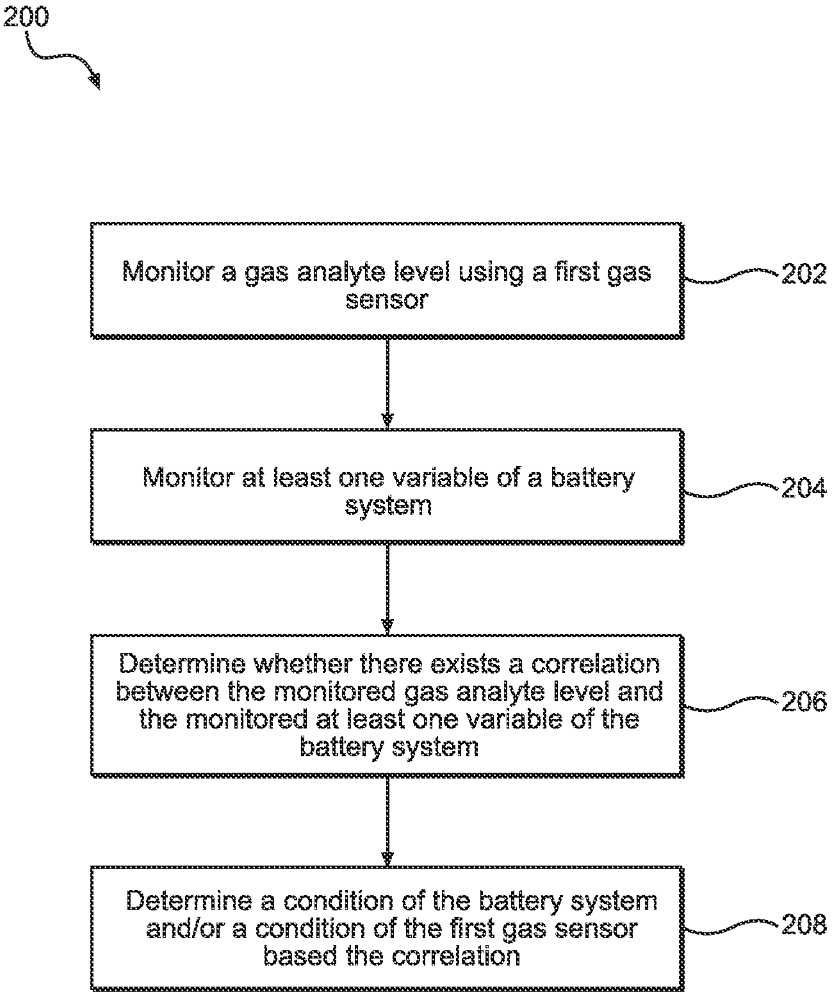
FIG. 2 is an exemplary method of monitoring gas analyte of a battery system based on data correlation.

FIG. 2 shows an example computer implemented method 200 performed by the system 100 to determine whether there is an electrolyte leakage from a battery system. The method 200 includes monitoring a gas analyte level using a first gas sensor (step 202). The at least one gas sensor 102 (e.g., any suitable gas sensor) is configured to detect the gas analyte 104. The at least one gas sensor 102 is positioned on or in close proximity to the battery 106 such that it is continuously monitoring/measuring the present gasses and detects any gas analyte 104 released by the battery 106. The at least one gas sensor 102 generates sensor signals 110 corresponding to the amounts of gas detected.

The method 200 includes monitoring at least one variable of a battery system (step 204). The at least one sensor 112 (e.g., any suitable sensor) is configured to monitor at least one variable of the battery 106, such as temperature, relative humidity, charging/discharging current, airflow surrounding the battery 106, etc.).

The method 200 includes determining whether there exists a correlation between the monitored gas analyte level and the monitored at least one variable of the battery system 106 (step 206) and determining a condition of the battery system and/or a condition of the first gas sensor based on the correlation (step 208).

Figure 3A:
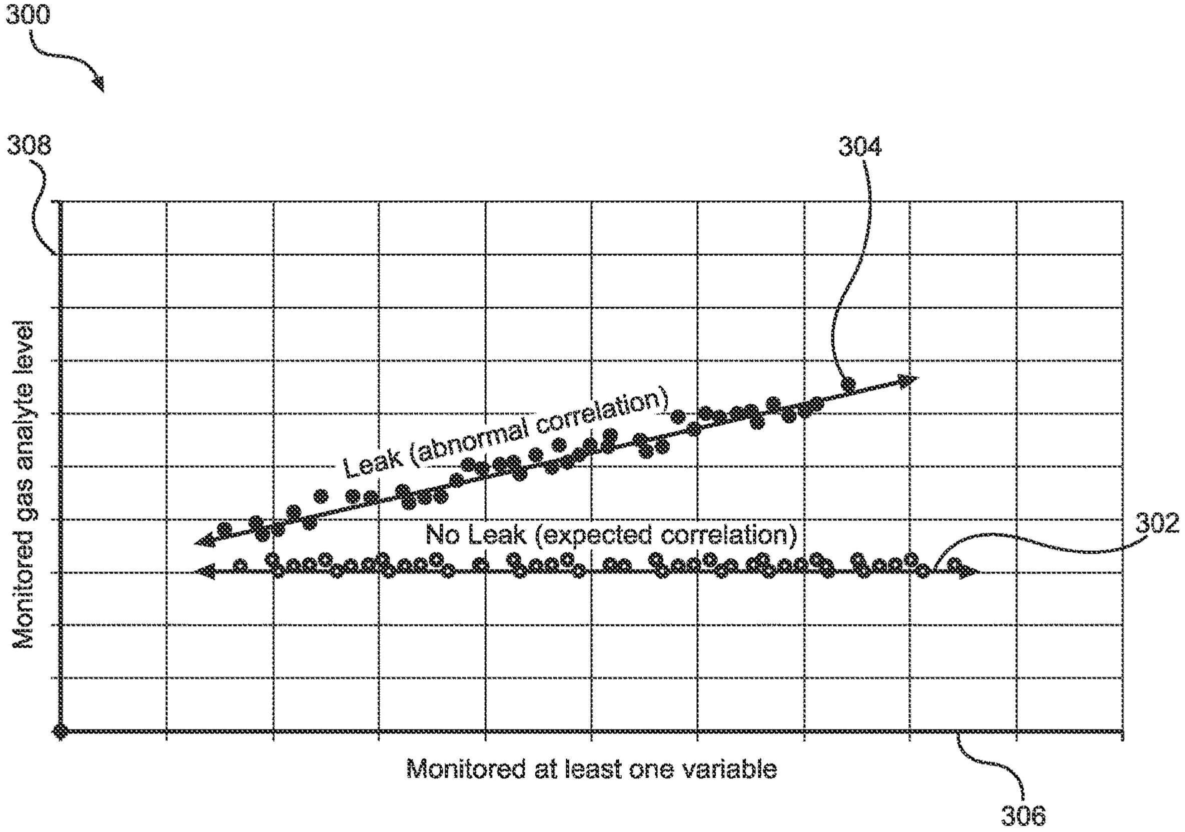
FIG. 3A shows exemplary correlation between monitored gas analyte level and a monitored variable of the battery system.

In step 208, determining a condition of the battery system may include determining whether there is an electrolyte leakage from the battery system based on the determination of the correlation. The sensor signals 110 and 114, data, or information are processed or analyzed by the controller 116 to determine if there is a correlation between the two. FIG. 3A shows an example plot 300 with a reference data series trend 302 and a test data series trend 304 plotted on an X-axis corresponding to the monitored at least one variable 306 (e.g., a variable of the battery 106 or a variable corresponding to an environmental condition of the battery 106) and a Y-axis corresponding to the monitored gas analyte level 308.

The reference data series trend 302 shows an expected correlation. The monitored gas analyte level remains relatively constant/unchanged as the monitored at least one variable changes (e.g., increasing or decreasing). In this case, the monitored gas analyte level has no correlation with the at least one variable of the battery 106 (e.g., temperature, relative humidity, charging/discharging current, airflow surrounding the battery 106, etc.), indicating no electrolyte leakage.

In the test data series trend 304, the monitored gas analyte level increases relatively linearly as the monitored at least one variable increases, indicating there is a relatively linear correlation between the two variables. In this case, the correlation of the monitored gas analyte level with the at least one variable of the battery 106 (e.g., temperature, relative humidity, charging/discharging current, airflow surrounding the battery 106, etc.) deviates from that of the reference data series trend 302. This deviation in correlation indicates there is an electrolyte leakage.

The linear correlation in the plot 300 is only shown as a non-limiting example. There can be non-linear correlations between the monitored gas analyte level and the monitored at least one variable of the battery 106. Any correlation (e.g., linear, non-linear, exponential, logarithmic, cubic, etc.) between the monitored gas analyte level and the monitored at least one variable of the battery 106 which deviates from the expected correlation (e.g., the reference data series trend 302) indicates electrolyte leakage.

The controller 116 or the algorithm 122 may be configured to determine the presence of electrolyte leakage based on correlation coefficient. For example, the controller 116 or the algorithm 122 may be configured to determine there is an electrolyte leakage if an absolute value of a correlation coefficient of the test data series trend 304 is greater than a pre-determined value. As another example, the controller 116 or the algorithm 122 may be configured to determine there is an electrolyte leakage if a difference between the correlation coefficient of the reference data series trend 302 and the correlation coefficient of the test data series trend 304 is greater than a pre-determined threshold.

Figure 3B:
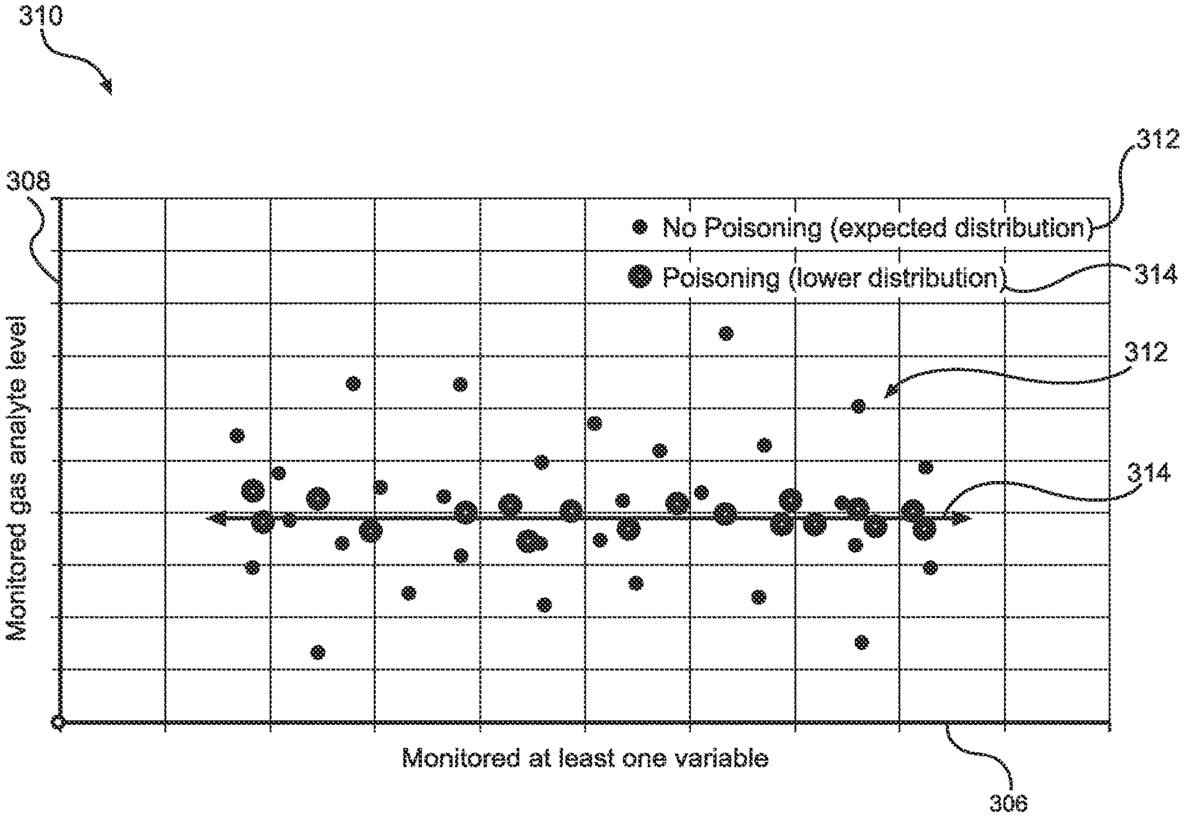
FIG. 3B shows another exemplary correlation between monitored gas analyte level and a monitored variable of the battery system.

In step 208, determining a condition of the first gas sensor may include determining whether the first gas sensor is poisoned based on the determination of the correlation. The sensor signals 110 and 114, data, or information are processed or analyzed by the controller 116 to determine if there is a correlation between the two and to determine a degree of data distribution. FIG. 3B shows an example plot 310 with a reference data series trend 312 and a test data series trend 314 plotted on the X-axis corresponding to the monitored at least one variable 306 (e.g., a variable of the battery 106 or a variable corresponding to an environmental condition of the battery 106) and the Y-axis corresponding to the monitored gas analyte level 308.

The reference data series trend 312 shows an expected correlation with an expected data distribution where there is no correlation between the two variables. The data distribution shows natural fluctuations as expected since the at least one gas sensor 102 is expected to respond to natural fluctuations of gases in the background gas (e.g., ambient gas) in the battery enclosure 108. This results in a considerable distribution of data around the expected correlation 312 over time. The reference data series trend 312 indicates that the gas sensor (e.g., the at least one gas sensor 102) is not poisoned.

In the test data series trend 314, the monitored gas analyte level remains relatively constant/unchanged as the monitored at least one variable changes. The degree of data distribution/scatter is lower than that of the reference data series trend 312, indicating the gas sensor (e.g., the at least one gas sensor 102) is poisoned. If the gas sensor becomes poisoned, the responses to the fluctuation of background gases would be lower, resulting in less distribution of data from the gas sensor.

The controller 116 or the algorithm 122 may be configured to determine whether the gas sensor (e.g., the at least one gas sensor 102) is poisoned based on a degree of data distribution or fluctuation index. In one example, the controller 116 or the algorithm 122 may be configured to determine that the gas sensor is poisoned if the data distribution or fluctuation of the test data series trend 314 is below a pre-determined value or threshold. As another example, the controller 116 or the algorithm 122 may be configured to determine that the gas sensor is poisoned if the difference between the data distribution or fluctuation of the test data series trend 314 and that of the reference data series trend 312 is greater than a pre-determined value or threshold.

In one non-limiting example, the monitored at least one variable in FIGS. 3A and 3B is temperature of the battery 106.

In addition to detecting electrolyte leakage based on correlation between the monitored gas analyte level and the monitored variable of the battery (e.g., correlation methods to determine electrolyte leakage), the system 100 is configured to resolve leaking electrolyte solvent vapors in the presence of other gases. The at least one gas sensor 102 can be sensitive to other gases which could come from other volatile organic compounds (VOCs) such as adhesives or off-gassing gasket materials in a battery module. The system 100 is capable of reliably differentiating when the sensor response is caused by small amounts of electrolyte vapor (true positive) or other VOCs (false positive).

In the embodiments that the system 100 is configured to differentiate gas species, the at least one gas sensor 102 may include gas sensors with induced or modulated gas sensor operational variables. For example, the at least one gas sensor 102 may include multiple micro hotplate sensors (e.g., second gas sensors), and in order to resolve the differences between the true and false positive scenarios, the operating temperature of the second gas sensors are modulated. The variation in the temperature causes different gas species to react differently with the sensor electrodes. This creates different signatures on the raw gas sensor signals that can be resolved to differentiate gases coming from a positive source (e.g., battery solvent vapors) or a false positive source (e.g., off-gassing adhesives). Furthermore, based on this approach, the system 100 can detect and classify battery coolant leaks. The cooling liquid used in a liquid cooled module of a battery typically contain glycol-water mixtures (e.g., 50:50 ethylene glycol/water mixtures in internal combustion engine automotive radiators for engine coolant). The system 100 is further configured to detect leaks of the battery coolant and hence able to monitor for a unique failure mode in the battery.

As an example, the system 100 is configured to sort the responses of the second gas sensors (e.g., micro hotplate sensors) into carbonates and non-carbonates. The solvents in lithium-ion batteries are carbonate-based solvents hence the presence of carbonate-based solvents indicates a leaking battery cell (e.g., electrolyte leakage), whereas the presence of hydrogen may indicate electrolysis occurring inside the battery module due to a coolant leak or water ingress.

Figure 4:
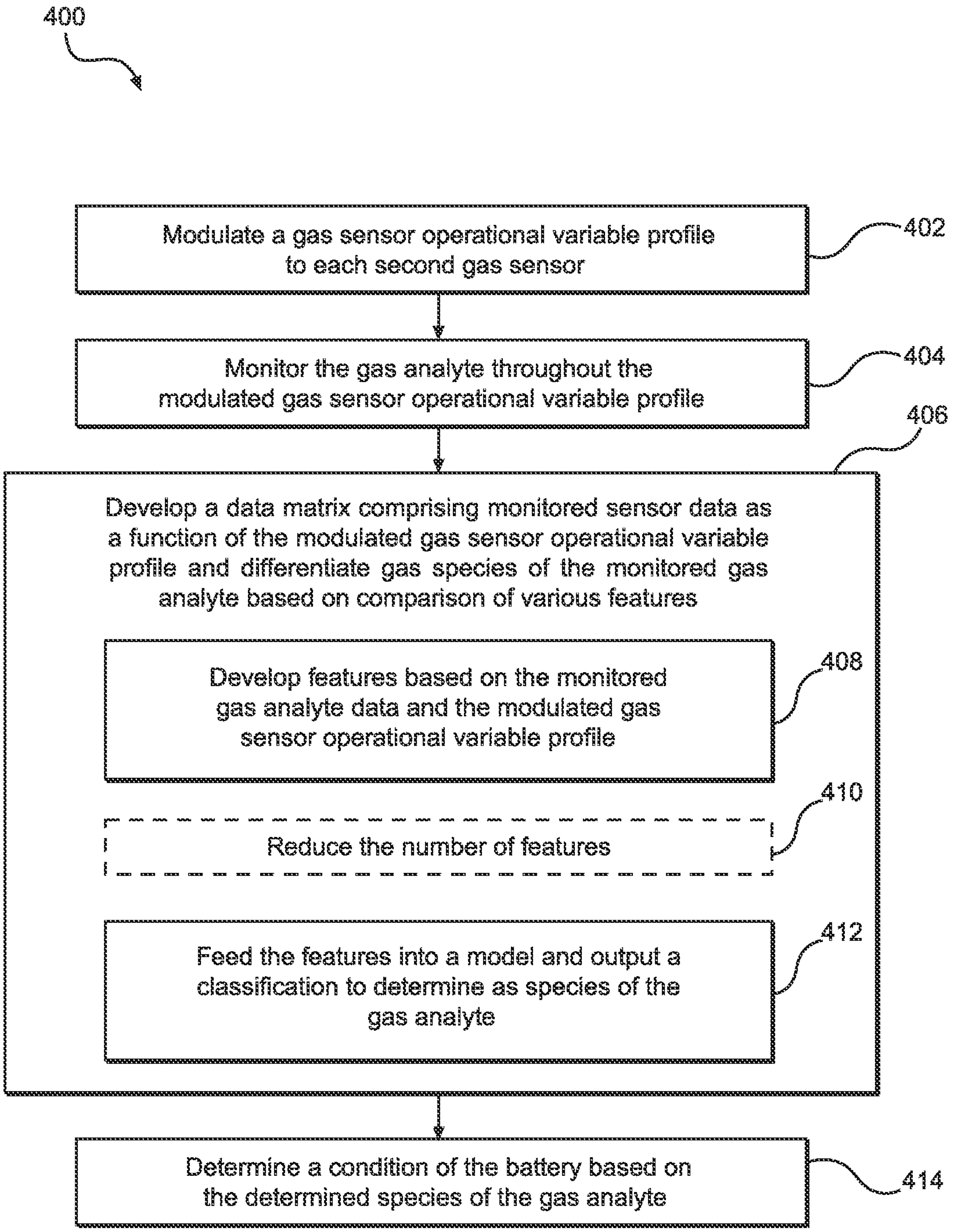
FIG. 4 shows an exemplary method of monitoring gas analyte of a battery system based on modulated temperature profiles and monitored data.

FIG. 4 shows an example computer implemented method 400 performed by the system 100 to differentiate the gas species and determine a condition of the battery 106 based on the differentiation of the gas species. Method 400 includes modulating a gas sensor operational variable profile to each second gas sensor (step 402). The gas sensor operational variable discussed herein refers to any variable to control/operate the gas sensor, including but is not limited to temperature and bias applied to the sensor element, such as power, voltage, current, or polarity bias, etc. For the purpose of discussion, temperature modulation is described below as an example; however, method 400 can be performed based on modulation of any one or more of the gas sensor operational variables.

Step 402 includes modulating the electrode temperature of each of the second gas sensors (e.g., micro hotplate sensors) in any suitable waveform (e.g., any periodic temperature variation as a function of time). The gas sensor temperature profile modulation can be achieved via any suitable modulation of a gas sensor operational variable (e.g., hotplate temperature, bias applied to the sensor element, such as power, voltage, current, polarity, etc.).

In one example, the electrode temperature of each of the second gas sensors is modulated between an initial temperature (e.g., a temperature at 0% capacity or a minimum temperature) and a final temperature (e.g., a temperature at 100% capacity or a maximum temperature) with a pre-determined variation (e.g., increase or decrease) level and a pre-determined time interval. Each pre-determined variation may be a pre-determined temperature variation such as 5 degrees Celsius, ° C., 10° C., 15° C., 20° C., etc. or a pre-determined gas sensor operational variable variation (e.g., power or voltage variation) such as 5%, 10%, 15%, etc. In one example, step 402 includes modulating the multiple electrodes of the second gas sensors 102 from a minimum temperature of 100° C. to a maximum temperature of 400° C. at a rate of 10° C. per second. Step 402 includes holding the multiple electrodes of the second gas sensors 102 at each temperature for an effective time period. In step 402, the electrodes of the second gas sensors 102 may have the same or different modulated temperature profiles.

The method 400 includes monitoring the gas analyte throughout the modulated gas sensor operational variable profile (temperature profile for example) (step 404). The method 400 includes developing a data matrix comprising monitored sensor data as a function of the modulated gas sensor operational variable profile (temperature profile for example) and differentiating gas species of the monitored gas analyte based on comparison of various features (step 406). The processor 118 receives sensor signals 110 (e.g., impedance) and the temperature data from the second gas sensors 102. The collected sensor signals 110 (e.g., impedance data) at every sensor temperature variable step (e.g., the impedance at each temperature on all the electrodes) are "features" that can be used for pattern recognition/classification. Any suitable algorithm or analysis approach 122 stored in the memory 120 may be used to perform step 406.

In one example, machine learning or deep learning approaches may be applied to perform step 406. Specifically, based on machine learning, step 406 includes developing features based on the monitored gas analyte data and the modulated gas sensor operational variable profile (temperature profile for example) (step 408). The number of features depends on the sets of data collected. In a case that the monitored gas analyte data are collected from three electrodes at temperature profiles ramped form 100° C. to 400° C. at a 5° C. interval, the total number of features is 183, the average impedance at each temperature over the course of a one-minute period of a temperature ramp for 100 to 400° C. (61 temperature intervals). Therefore, the method 400 may optionally include reducing the number of features (step 410). Principle Component Analysis (PCA) may be applied to reduce the number of features. This step is not necessarily needed to be taken to fit and evaluate a model but is an option to reduce dimension size. Furthermore, additional environmental variables of the battery 106, such as the information measured by the at least one sensor 112 (e.g., temperature, relative humidity, battery current, airflow, etc.). Alternatively, unique features can be generated via any suitable modulation of a gas sensor operational variable (e.g., hotplate temperature, bias applied to the sensor element, power, voltage, current, polarity, etc.) in step 406, the features may be developed based on the monitored gas analyte data and the modulated bias power, voltage, current and/or polarity.

The method 400 includes feeding the features into a model (e.g., a machine learning or ML model) and outputting a classification to determine gas species of the gas analyte (step 412). Candidate ML models are stored in the memory 120 (e.g., the algorithm 122) to analyze the features. The candidate ML models can be any supervised machine learning models, such as the k Nearest Neighbors (kNN) technique.

The method 400 includes determining a condition of the battery based on the determined species of the gas analyte 104 (step 414). Specifically, the system 100 and the method 400 are capable of sorting the gas analyte (e.g., into carbonates and non-carbonates) and/or differentiating or classifying the gas analyte 104 into specific species to determine a condition of the battery 106. For example, the detection of hydrogen indicates electrolysis occurring inside the battery 106 due to a coolant leak or water ingress, and the detection of one or more electrolyte vapors indicates electrolyte leakage.

The at least one gas sensor 102 and the candidate models are pre-trained before the deployment. The steps 402 to 410 may be done offline to tune/fit the model, and then the steps 402 to 414 are executed in real-time for classification and determination.

Figure 5A:
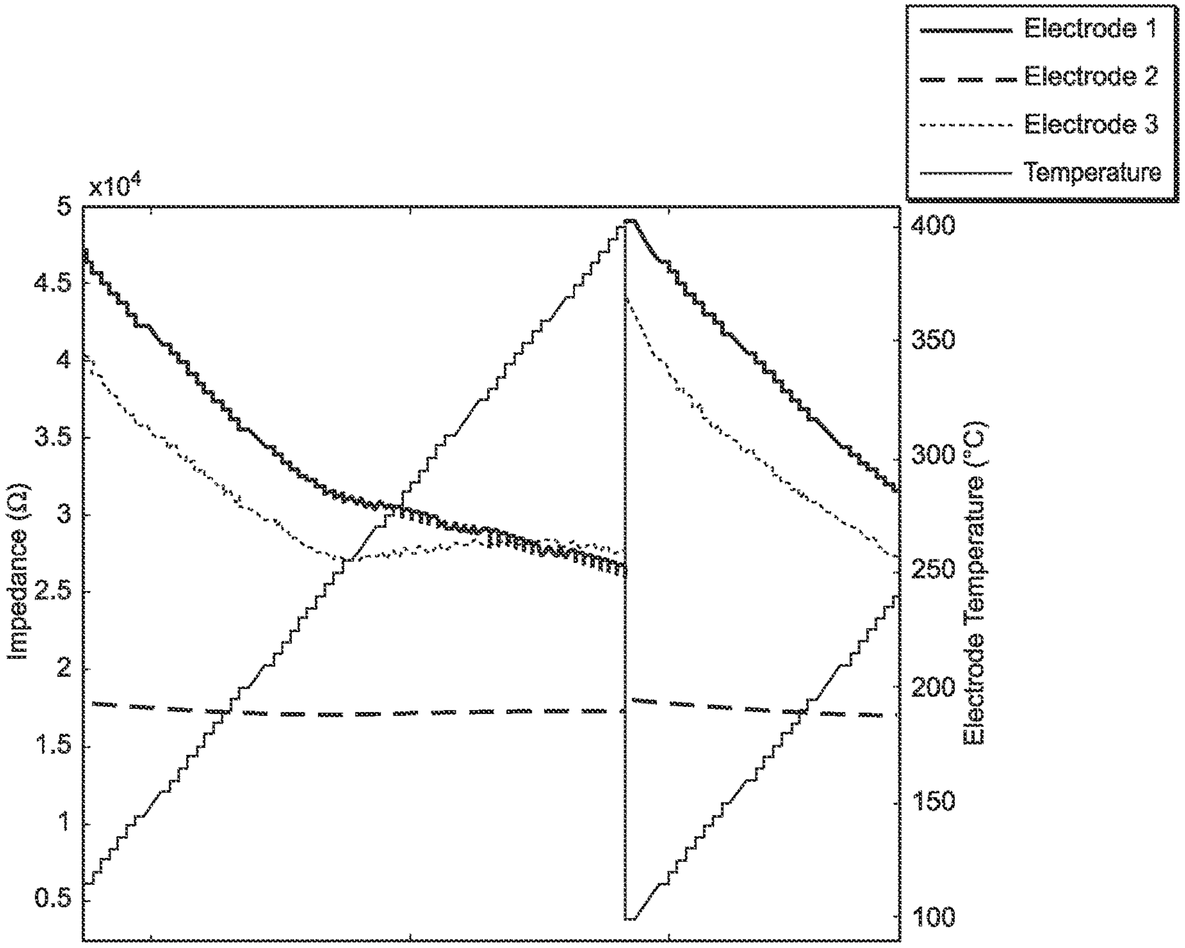
FIGS. 5A-5D show exemplary analysis to differentiate gas species based on data matrix processed based on the exemplary method of FIG. 4.
Figure 5B:
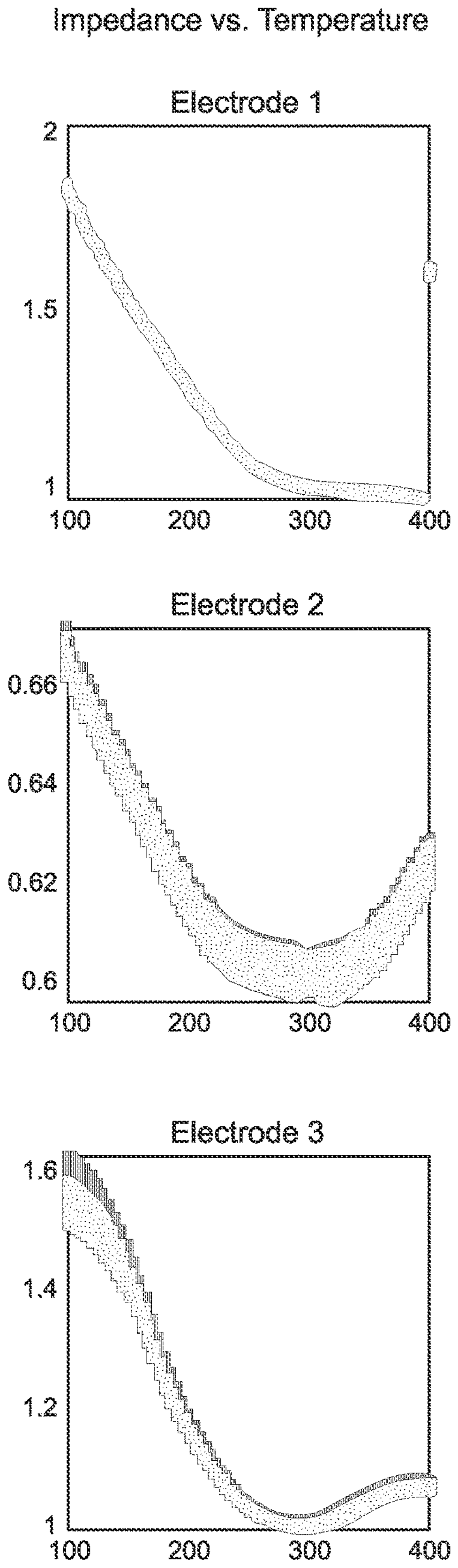
Figure 5C:
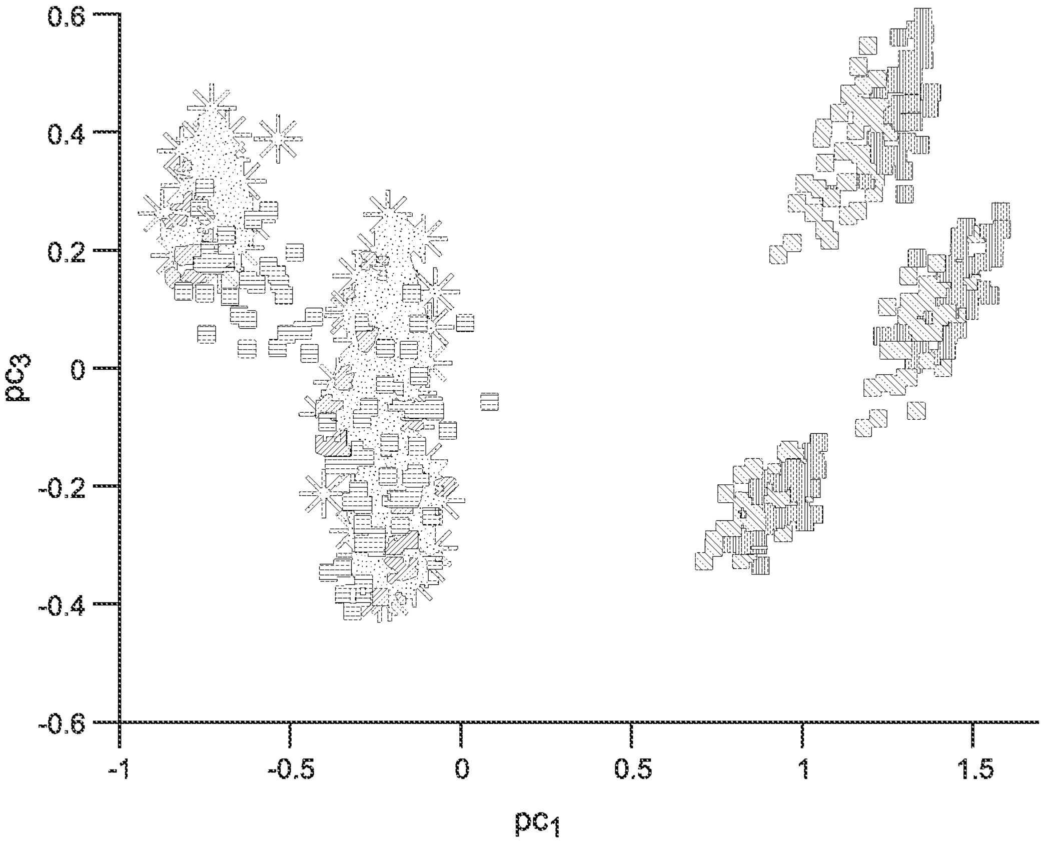
Figure 5D:
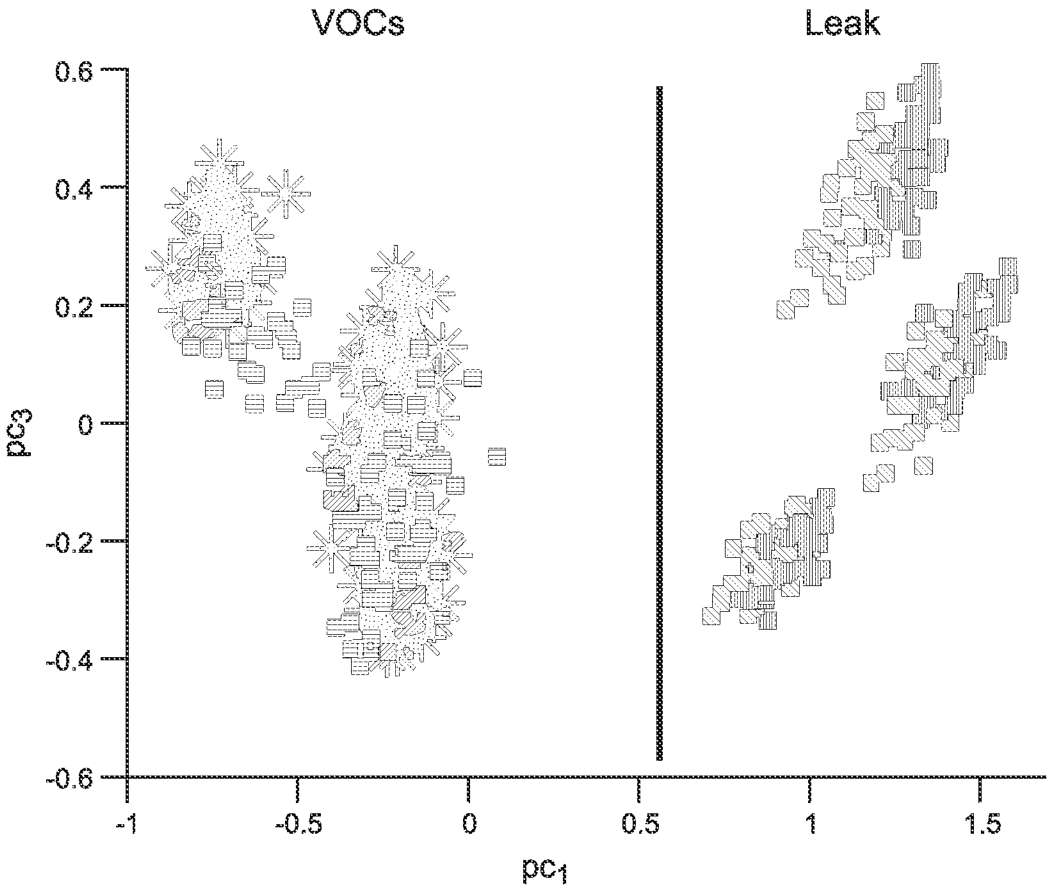

FIG. 5A shows an example of impedance versus temperature plot for the system 100 with three electrodes (e.g., three second gas sensors) as the temperature profile is modulated to ramp from 100° C. to 400° C. FIG. 5B shows example measurable features of the monitored data in FIG. 5A for each of the three electrodes. Based on PCA, the number of features is reduced as shown in FIG. 5C. As the features are fed into a ML model, the monitored gas analyte is distinguishable after one full sensor modulation period between typical VOC interfering substances (false positive detections) and an actual electrolyte leak (true positive detections) as shown in FIG. 5D. The classification, such as the one shown in FIG. 5D, can made after every modulation cycle, after every sampled period, or both.

Figure 6:
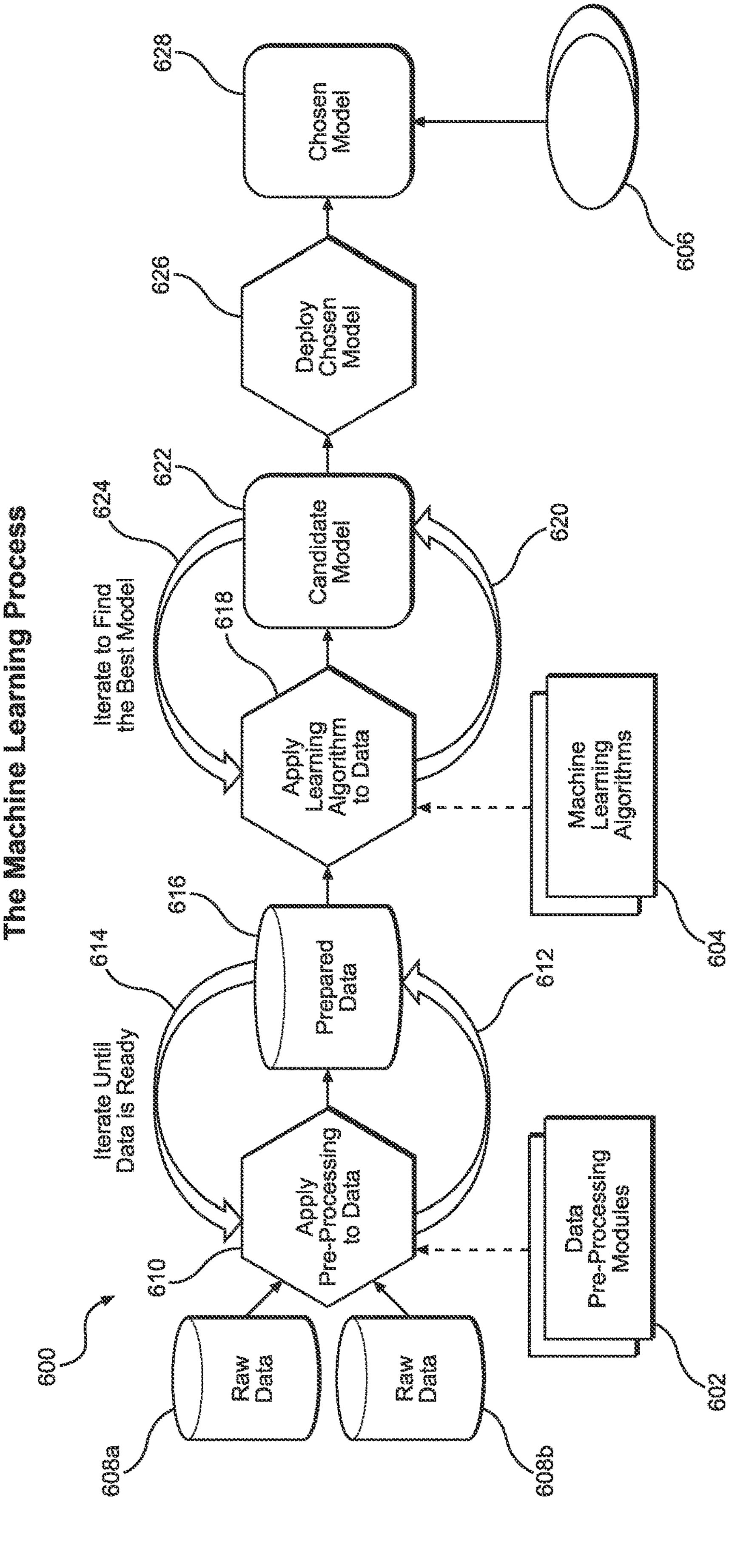
FIG. 6 shows an exemplary machine learning (ML) classification design process.
Figure 7:
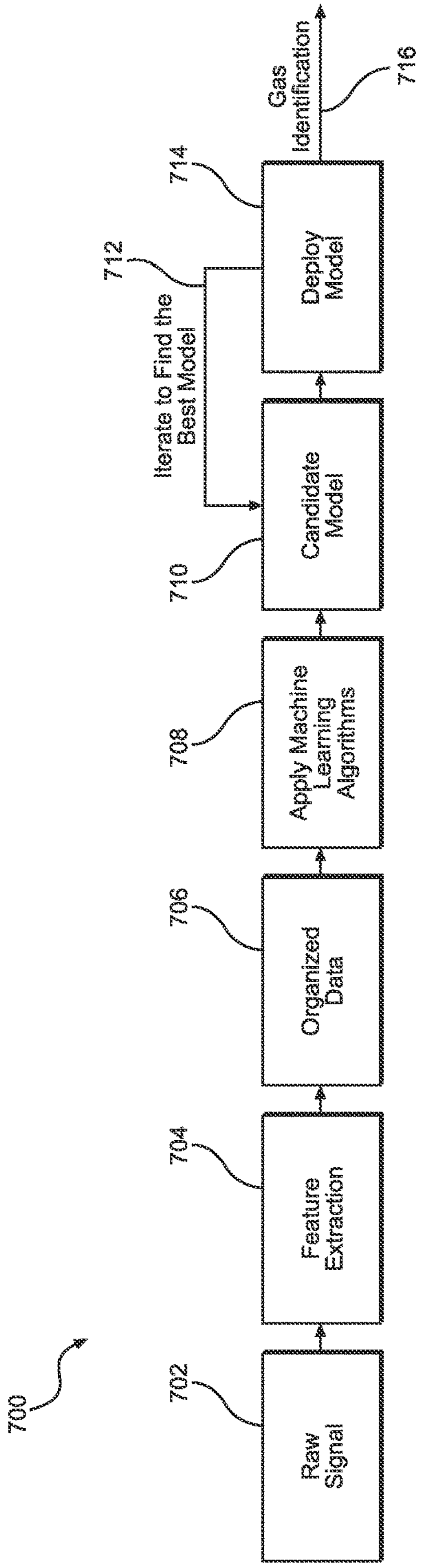
FIG. 7 is an exemplary flow diagram showing a process of utilizing a ML algorithm to pre-train the gas sensors based on known gas analyte.

FIG. 6 and FIG. 7 depict an example of a ML Classification design process or how the ML algorithm may be developed. The pre-training (supervised learning) approach may combine many signal features (from the at least one gas sensor 102 and the at least one sensor 112) using both heuristic and physics-based impedance information in the data pre-processing step of the algorithm development phase. It may also include environmental measurements such as temperature, relative humidity, airflow, charging/discharging current, etc. included in the sensor set offering. For example, the signal features may include moving average, Bollinger band, minimum electrode impedance, maximum rate of impedance change, maximum rate of recovery of impedance for each electrode, principal component analysis (PCA), and linear discriminant analysis. Additionally, the pre-training (supervised learning) of the gas sensor to distinguish an OGE or TRE from a non-OGE using other techniques may also include, but is not limited to classification techniques such as: support vector machine, discriminant analysis or nearest neighbor algorithm, basic statistics of the distribution of time series values (e.g., location, spread, Gaussianity, outlier properties), linear correlations (e.g., autocorrelations, features of the power spectrum), stationarity (e.g. sliding window measures, prediction errors), information theoretic and entropy/complexity etc.

In FIG. 7, an exemplary flow diagram shows a process 700 of utilizing a ML algorithm to pre-train the at least one gas sensor 102 based on a plurality of known gas analyte. For example, in step 702, for each known gas analyte, raw sensor signals 110 such as resistance and capacitances may be generated from the multi-electrodes of the at least one gas sensor 102 and sent to the processor 118 for features extraction (e.g., changes in impedance or transfer function over time duration) in step 704. The features extraction step 704 may include time-frequency transformation (such as discrete cosine transformation DCT or discrete Fourier transformation DFT) to transform time domain analog signals into frequency domain signals. In step 706, the extracted features may be organized accordingly. In step 708, ML algorithms are applied to the organized data to establish a candidate model 710 (such as multi-dimensional decision boundaries construction). By repeating steps 702 to 710 for the remaining of the plurality of known gas analyte, the Candidate model 710 may be updated (see step 712) to establish a database or to build a composite decision boundaries plot to complete the ML algorithm 122 training which is stored in the memory 120 to be executed by the processor 118. More specifically, step 708 may be accomplished by repeating training steps. Each of the training steps may include sequentially carrying out the operations of: convolution, rectified linear unit (ReLU) and pooling operations. The Deploy model 714 would be a field ready ML algorithm when working in conjunction with the multi-electrode gas sensor to perform gas analyte classifications.

Alternatively, these desired classifications may be achieved with deep learning algorithms, utilizing pre-trained convolution neural networks (e.g., Convolutional Neural Network CNN and Long Short-Term Memory (LSTM)) and automatic signal feature extraction.

Figure 8:
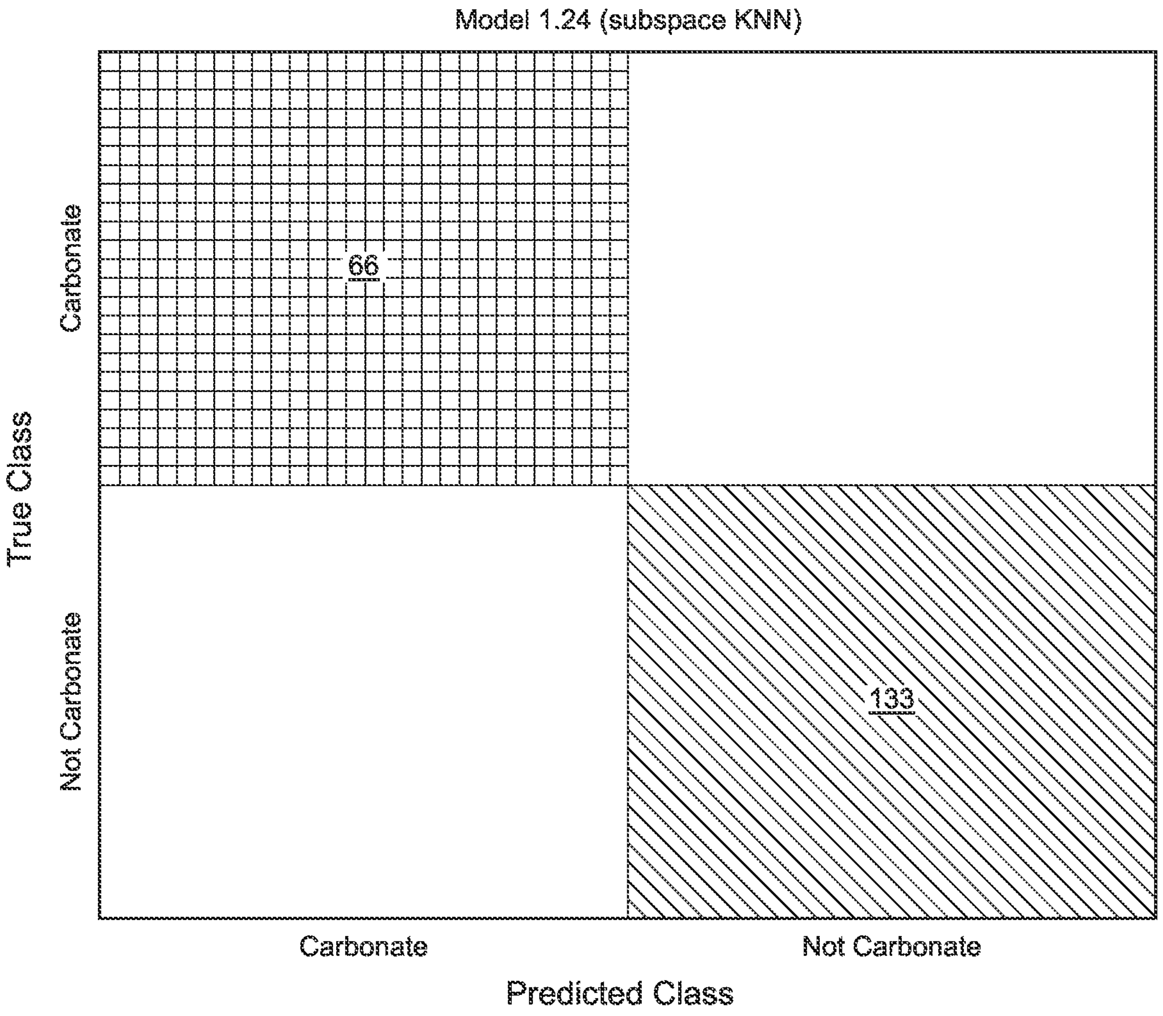
FIG. 8 shows an exemplary output summary of the monitored gas analyte using the systems and methods disclosed herein.
Figure 9:
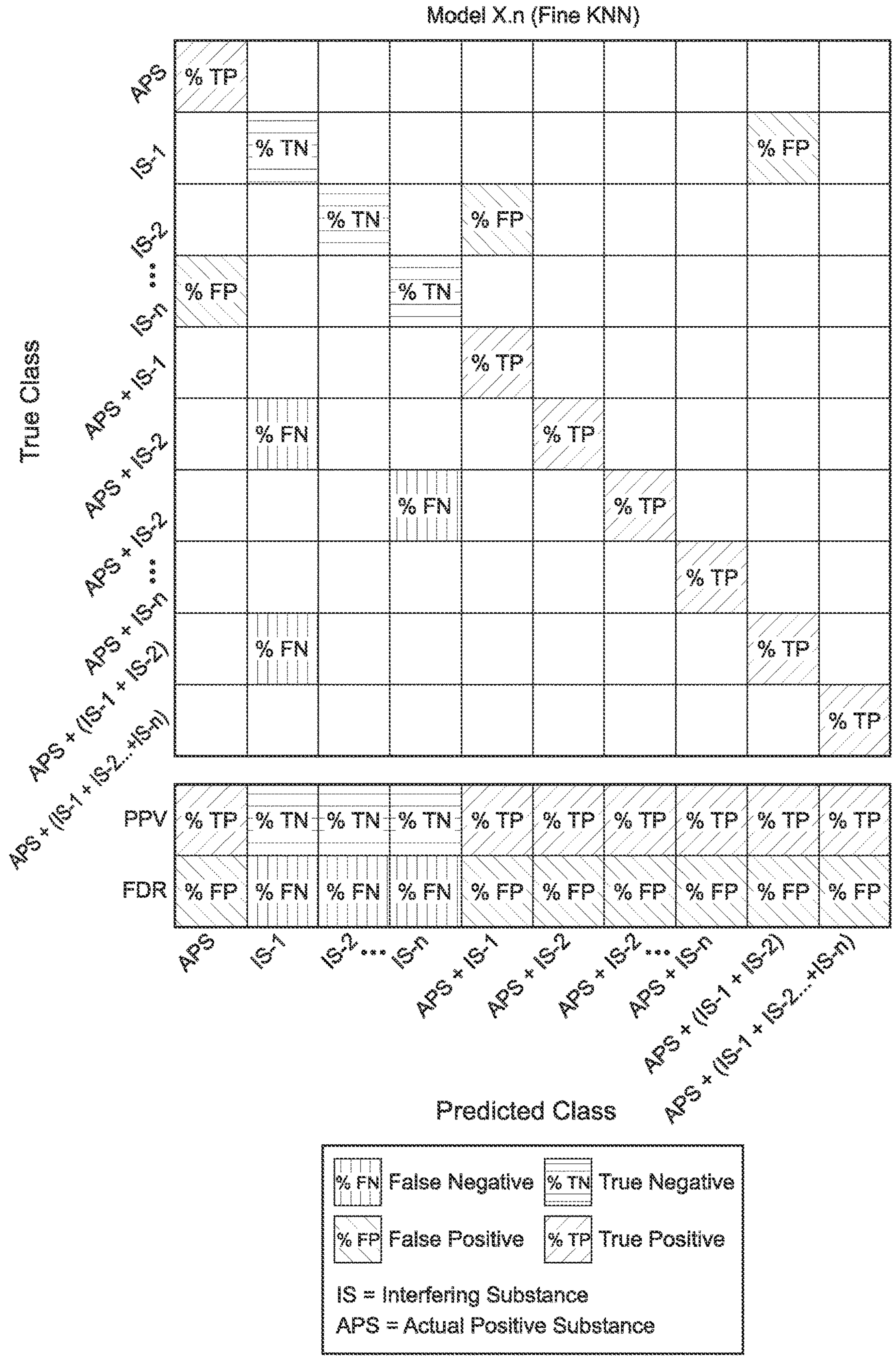
FIG. 9 shows another exemplary output summary of the monitored gas analyte using the systems and methods disclosed herein.

The methods and analysis disclosed herein enable differentiation of the gas analyte 104 based on ML techniques. FIGS. 8 and 9 show two examples of output summaries based on the systems and methods disclosed herein. FIG. 8 shows an example that the methods and systems disclosed herein are able to accurately differentiate the gas analyte 104 into carbonates and non-carbonates without false positive and false negative. FIG. 9 is an example positive predictive rates matrix of various gas species.

Furthermore, the method 400 may be modified to determine a condition of the gas sensor, such as a poisoned gas sensor. For example, the method may include modulating a gas sensor temperature profile to each gas sensor, monitoring the gas analyte throughout the modulated gas sensor temperature profile, and developing a data matrix comprising monitored gas sensor data as a function of the modulated gas sensor temperature profile and differentiating the gas sensor responses based on comparison of various features. The features are fed into a model and output a classification to determine the unique gas sensor response characteristics. The method then determines whether the gas sensor is poisoned based on the determined gas sensor response. The method may include training the model with data sets collected from a broad range of gas sensor environments using poisoned gas sensors to develop poisoned gas sensor data. The gas sensor features respond uniquely when the gas sensor is poisoned; therefore the model can be trained to differentiate a poisoned gas sensor.

The methods 200 and 400 disclosed herein may be used alone or in combination. For example, the method 400 can be used to confirm the results of the method 200 and further confirms the detected gas species. In some embodiments, the method 200 and/or the method 400 may include a step to report or alert the determined battery condition (e.g., electrolyte leakage, coolant leakage, etc.) and/or the detected gas species. For example, upon determination, the method 200 or 400 may include a step to send an early warning including a logic signal output, an audible alarm, a visual alarm, fire suppression, and/or communication with other systems and a user.

To the extent that the term "includes" or "including" is used in the specification or the claims, it is intended to be inclusive in a manner similar to the term "comprising" as that term is interpreted when employed as a transitional word in a claim. As used in the specification and the claims, the singular forms "a," "an," and "the" include the plural. Furthermore, to the extent that the term "or" is employed (e.g., A or B), it is intended to mean "A or B or both." Finally, where the term "about" or "approximately" is used in conjunction with a number, it is intended to include within ±5%, within ±4%, within ±3%, within ±2%, within ±1%, or within ±0.5% of the number.

As stated above, while the present application has been illustrated by the description of embodiments, and while the embodiments have been described in considerable detail, it is not the intention to restrict or in any way limit the scope of the appended claims to such detail. Additional advantages and modifications will readily appear to those skilled in the art, having the benefit of this application. Therefore, the application, in its broader aspects, is not limited to the specific details and illustrative examples shown. Departures may be made from such details and examples without departing from the spirit or scope of the general inventive concept.

The invention claimed is:

1. A computer implemented method comprising:
- monitoring a gas analyte level associated with a battery system using a first gas sensor;
- monitoring at least one variable of the battery system;
- determining whether there exists a correlation between the monitored gas analyte level and the monitored at least one variable of the battery system;
- determining whether there is an electrolyte leak from the battery system based on the determination of the correlation;
- modulating a sensor-operational-variable profile to each of second gas sensors configured to monitor the gas analyte associated with the battery system;
- monitoring the gas analyte using the second gas sensors throughout the modulated sensor-operational-variable profiles;
- developing a data matrix comprising sensor signals generated by the second gas sensors as a function of the modulated sensor-operational-variable profiles;
- differentiating gas species of the gas analyte based on a comparison of various features in the data matrix; and
- determining a condition of the battery system based on the differentiation of gas species.

2. The computer implemented method of claim 1, wherein the correlation comprises an increasing trend of the monitored gas analyte level as the monitored at least one variable of the battery system increases.

3. The computer implemented method of claim 1, wherein the battery system is a lithium-ion battery system.

4. The computer implemented method of claim 1, wherein the monitored gas analyte comprises electrolyte gases and non-off-gas-event (non-OGE) interfering gases.

5. The computer implemented method of claim 4, wherein the non-OGE interfering gases comprise hydrogen and/or a coolant.

6. The computer implemented method of claim 1, wherein the monitored at least one variable of the battery system comprise a temperature of the battery system.

7. The computer implemented method of claim 1, wherein the monitored at least one variable of the battery system comprise an electrical current of the battery system.

8. The computer implemented method of claim 1, wherein the monitored at least one variable of the battery system comprise a relative humidity surrounding the battery system.

9. The computer implemented method of claim 1, wherein the monitored at least one variable of the battery system comprise an airflow surrounding the battery system.

10. The computer implemented method of claim 1, comprising pre-training the second gas sensors based on a machine learning (ML) algorithm before an initial field deployment of the second gas sensors.

11. The computer implemented method of claim 1, wherein the condition of the battery system comprises one or more of electrolyte leakage, coolant leakage, cell venting, thermal runaway, water-ingress, and off-gas.

12. The computer implemented method of claim 1, comprising identifying a poisoned sensor of the second gas sensors.

13. The computer implemented method of claim 1, the sensor-operational-variable comprises temperature, power, voltage, polarity, and/or electrical current.

14. A monitoring system, comprising:

at least one gas sensor configured to monitor for a gas analyte associated with a battery system;

at least one sensor configured to monitor one or more variables of the battery system; and a controller, comprising:

a memory to store machine readable instructions; and a processor to access the memory and execute the machine-readable instructions, the machine-readable instructions causing the processor to:

monitor the gas analyte using the at least one gas sensor;

monitor the one or more variables of the battery system using the at least one sensor;

determine a correlation between monitored gas analyte level and the one or more variables;

determine whether there is an electrolyte leak from the battery system based on the correlation;

modulate a sensor-operational-variable profile to the at least one gas sensor;

monitor gas analyte level using the at least one gas sensor throughout the modulated sensor-operational-variable profile;

develop a data matrix comprising sensor signals generated by the at least one gas sensor as a function of the modulated sensor-operational-variable profile;

differentiate gas species of the gas analyte based on a comparison of various features in the data matrix; and determine a condition of the battery system based on the differentiation of gas species.

15. The monitoring system of claim 14, wherein the battery system is a lithium-ion battery system.

16. The monitoring system of claim 14, wherein the at least one sensor comprises one or more of a temperature sensor, a relative humidity sensor, an electrical current sensor, and an airflow sensor.

17. The monitoring system of claim 14, wherein the machine-readable instructions cause the processor to determine whether there is a coolant leak in the battery system based on the differentiation of gas species.

18. The monitoring system of claim 14, wherein the machine-readable instructions cause the processor to determine whether there is a water ingress in the battery system based on the differentiation of gas species.

19. The monitoring system of claim 14, wherein the machine-readable instructions cause the processor to determine whether the at least one gas sensor comprises a poisoned sensor.

20. The monitoring system of claim 14, wherein the sensor-operational-variable comprises temperature, power, voltage, polarity, and/or electrical current.

* * * * *